(12) United States Patent
Tarrant

(10) Patent No.: US 9,279,474 B2
(45) Date of Patent: Mar. 8, 2016

(54) FLYWHEEL ASSEMBLY

(75) Inventor: Colin Tarrant, Cheshire (GB)

(73) Assignee: Williams Hybrid Power Limited, Oxfordshire (GB)

( * ) Notice: Subject to any disclaimer, the term of this patent is extended or adjusted under 35 U.S.C. 154(b) by 46 days.

(21) Appl. No.: 13/257,017

(22) PCT Filed: Apr. 20, 2010

(86) PCT No.: PCT/GB2010/050643
§ 371 (c)(1),
(2), (4) Date: Oct. 27, 2011

(87) PCT Pub. No.: WO2010/122333
PCT Pub. Date: Oct. 28, 2010

(65) Prior Publication Data
US 2012/0031224 A1 Feb. 9, 2012

(30) Foreign Application Priority Data

Apr. 22, 2009 (GB) .................................... 0906883.4

(51) Int. Cl.
*F16C 15/00* (2006.01)
*F16F 15/16* (2006.01)
(Continued)

(52) U.S. Cl.
CPC ............. *F16F 15/3156* (2013.01); *Y02E 60/16* (2013.01); *Y10T 74/2126* (2015.01)

(58) Field of Classification Search
CPC ..... F16F 15/3156; F16F 15/30; F16F 15/315; Y02E 60/16; H02K 7/025; H02K 7/02; Y10T 74/2126; Y10T 74/2123; B60L 11/16; G01C 19/16

USPC ........ 74/572.1, 572.12, 572.2, 573.1, 573.11, 74/573.13, 5.5, 5.95; 903/960; 310/74, 51; 318/161
See application file for complete search history.

(56) References Cited

U.S. PATENT DOCUMENTS 3,980,358 A * 9/1976 Davis .............................. 384/99
4,102,220 A 7/1978 Brobeck
(Continued)

FOREIGN PATENT DOCUMENTS

EP 0 668 651 A1 8/1995
RU 2 246 034 C1 2/2005
(Continued)

OTHER PUBLICATIONS

United Kingdom Intellectual Property Office, Patents Act 1977: Search Report Under Section 17, Application No. GB0906883.4, mailed Jul. 23, 2009 (4 pages).
(Continued)

*Primary Examiner* — James Pilkington
*Assistant Examiner* — Adam D Rogers
(74) *Attorney, Agent, or Firm* — Wood, Herron & Evans, LLP

(57) ABSTRACT

A flywheel assembly is described which is suitable for use as a compact power storage device. The assembly comprises a housing, a flywheel coupled to a shaft which is rotatably mounted in the housing via bearings, a primary chamber which is defined within the housing and contains the flywheel, and a secondary chamber which is defined within the housing and contains the bearings. Furthermore, it includes a molecular pump driven by the shaft for pumping gas molecules from the primary chamber to the secondary chamber. Location of the bearings in a high pressure chamber inhibits off-gassing from the bearing grease. Furthermore, any such off-gassing under load will not increase the gas pressure in the first chamber containing the flywheel as it is separate from the secondary chamber containing the bearings.

11 Claims, 1 Drawing Sheet

(51) Int. Cl.
*H02K 7/02* (2006.01)
*F16F 15/315* (2006.01)

(56) References Cited

U.S. PATENT DOCUMENTS

| | | | |
|---|---|---|---|
| 5,462,402 A | | 10/1995 | Bakholdin et al. |
| 5,561,240 A | * | 10/1996 | Ochiai et al. .................... 73/40.7 |
| 5,767,595 A | | 6/1998 | Rosen |
| 5,821,650 A | * | 10/1998 | Gunsallus et al. .............. 310/74 |
| 6,144,128 A | | 11/2000 | Rosen |
| 6,884,039 B2 | * | 4/2005 | Woodard et al. ................. 417/51 |
| 6,995,529 B2 | * | 2/2006 | Sibley ............................. 318/161 |
| 7,053,589 B2 | * | 5/2006 | Gabrys et al. ................. 74/572.1 |
| 7,365,504 B2 | * | 4/2008 | Kroeger ......................... 318/161 |
| 8,726,762 B2 | * | 5/2014 | Rogers et al. .............. 74/573.13 |
| 2011/0232415 A1 | * | 9/2011 | Early et al. .................... 74/572.1 |

FOREIGN PATENT DOCUMENTS

| | | |
|---|---|---|
| RU | 2246034 C1 | 2/2005 |
| WO | 02/02943 A1 | 1/2002 |
| WO | 02/053911 A1 | 7/2002 |
| WO | WO 02053911 A1 * | 7/2002 |
| WO | 03/023942 A1 | 3/2003 |

OTHER PUBLICATIONS

European Patent Office, International Search Report and Written Opinion of the International Searching Authority, International Application No. PCT/GB2010/050643, mailed Sep. 21, 2010 (10 pages).

Partial uncertified English language translation of International Application No. WO 02/053911 A1, published on Jul. 11, 2002, pp. 4 to 6.

Espacenet, English Machine Translation of RU2246034C1, published Feb. 10, 2005, retrieved from http://worldwide.espacenet.com on Jul. 22, 2015 (6 pages).

Uncertified Partial Translation of RU2246034, published Feb. 10, 2005 (2 pages).

* cited by examiner

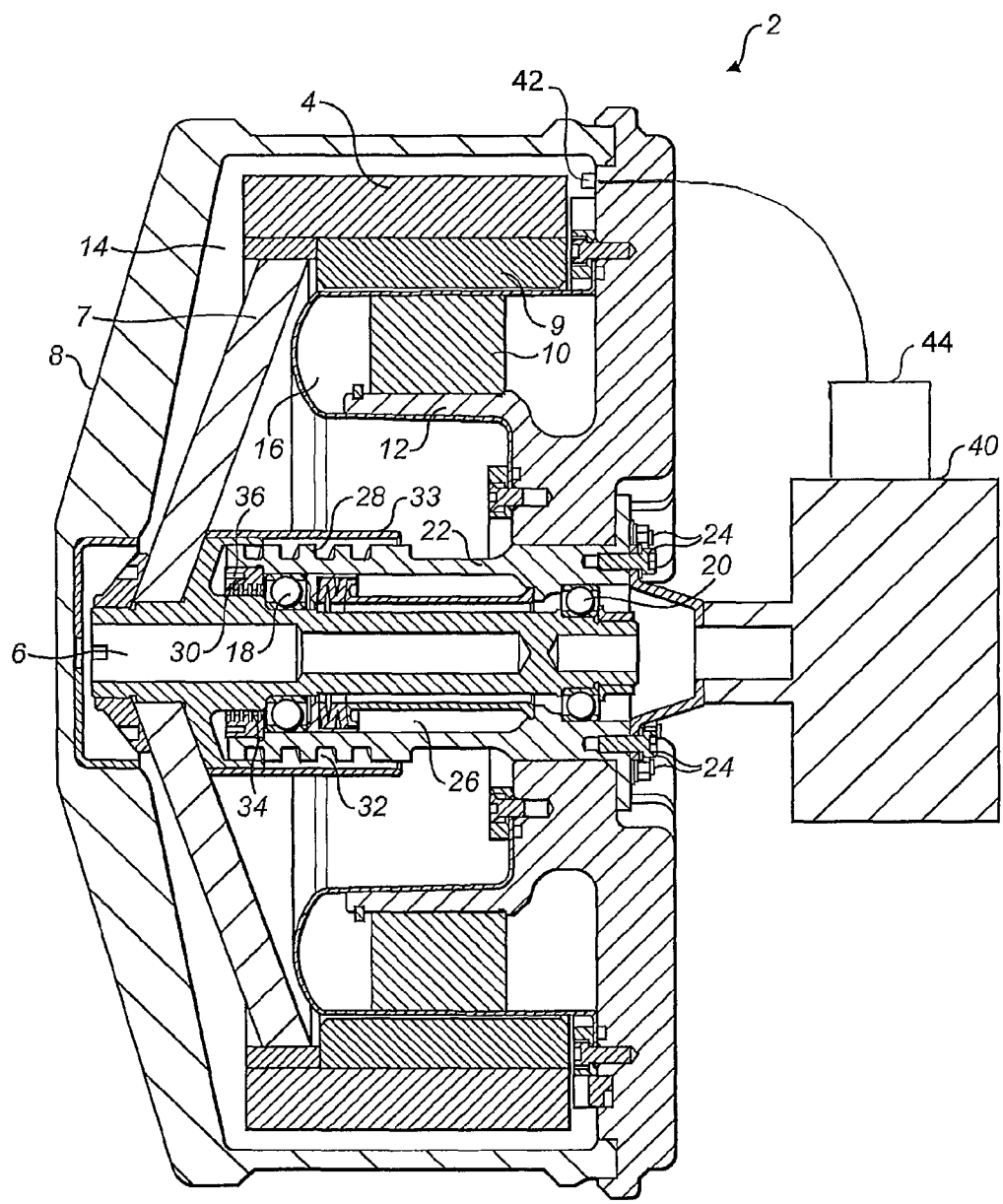

FLYWHEEL ASSEMBLY

CROSS-REFERENCE TO RELATED APPLICATION

This application is a submission under 35 U.S.C. §371 of International Application No. PCT/GB2010/050643, filed Apr. 20, 2010, which claims priority to Great Britain Application No. 0906883.4, filed Apr. 22, 2009, the disclosures of which are hereby expressly incorporated by reference herein in their entireties.

FIELD OF THE INVENTION

The present invention relates to a flywheel assembly. More particularly, it concerns control of the pressure within the housing of the assembly.

BACKGROUND OF THE INVENTION

Flywheels are increasingly being used as compact power storage devices, particularly in vehicles. The flywheel is mounted in a housing, the interior of which is maintained at low pressure to minimise drag on the flywheel as it rotates. Whilst this low pressure environment can readily be achieved before sealing the housing, fibre composite materials are often used in the construction of high energy density flywheels which emit gases long after fabrication, making it difficult to maintain the desired near vacuum conditions.

U.S. Pat. No. 5,462,402 describes a flywheel energy storage system including a flywheel disposed within a first chamber. A second chamber is provided which maintains a relatively high pressure. A shaft is suspended between a first bearing located in the first chamber and a second bearing in the second chamber. A molecular pump is driven by the shaft to pump gas molecules from the first chamber to the second chamber to maintain a low pressure environment in the first chamber.

SUMMARY OF THE INVENTION

The present invention provides a flywheel assembly comprising a housing, a flywheel coupled to a shaft which is rotatably mounted in the housing via bearings, a primary chamber which is defined within the housing and contains the flywheel, at least one secondary chamber which is defined within the housing and contains the bearings, and at least one molecular pump driven by the shaft for pumping gas molecules from the primary chamber to the at least one secondary chamber.

The bearings are preferably provided in a common secondary chamber. In an alternative arrangement a first bearing is contained within one secondary chamber and a second bearing is contained within another secondary chamber. In the latter embodiment, a molecular pump may pump gas molecules from the primary chamber into the secondary chambers. As a further variation, two molecular pumps are provided for pumping gas molecules from the primary chamber to a respective secondary chamber.

The flywheel may be coupled to the shaft indirectly, via gearing or another form of coupling. Alternatively, the flywheel may be mounted directly on the shaft.

Providing the bearings in a second, higher pressure chamber is beneficial where the bearings require a grease which has a high vapour pressure. In a lower pressure environment, the grease will be liable to release gas or "off-gas" causing accelerated degradation of the grease and its lubricating properties. Location of the bearings in a higher pressure chamber permits the use of more commonly available greases with lower vapour pressures.

Furthermore, any off-gassing from the bearing grease under load will not increase the gas pressure in the first chamber containing the flywheel.

In the preferred embodiment, the bearings are provided between the shaft and a hub which extends along the shaft from an inner wall of the housing. In this configuration the secondary chamber is therefore defined between the hub and the shaft.

Preferably, an additional pump is provided to remove gases from the secondary chamber. The pump may be operable to control the pressure in the secondary chamber, and consequently control the gas pressure in the low pressure primary chamber. The additional pump may be a getter pump or a vacuum pump, for example. A vacuum pump may be provided together with a controller coupled to a sensor for sensing the pressure in the primary chamber. The controller may be operable to control the vacuum pump with reference to signals from the sensor.

In preferred embodiments, the molecular pump is provided towards and/or adjacent to the distal end of the hub. More particularly, it may be a molecular drag pump which includes a spiral groove formed on the hub. In a preferred configuration, two spiral grooves are formed on inner and outer surfaces of the hub, respectively.

In a preferred configuration, the flywheel carries the rotor of a drive motor and the stator of the motor is supported by the housing.

BRIEF DESCRIPTION OF THE DRAWINGS

An embodiment of the invention will now be described with reference to the accompanying FIGURE, which is a cross-sectional side view of a flywheel assembly embodying the invention.

DETAILED DESCRIPTION OF THE INVENTION

The FIGURE shows a cross-sectional side view of an electrically driven flywheel assembly 2. A carbon fibre flywheel 4 is mounted on a central shaft 6 via a composite end cap 7 and enclosed within a housing 8. Permanent magnets 9 are carried on the inner circumferential surface of the flywheel and form the rotor of a brushless DC motor.

The motor stator 10 is carried by a stator mount 12 which extends inwardly from the housing. It may have a known laminated construction, with three phase coil windings (not shown). The stator is oil cooled.

The flywheel rotates in a first chamber 14 which is defined within the housing and contains a partial vacuum. The stator is separated from the first chamber by a glass fibre can 16. The shaft 6 is rotatably supported by first and second bearings 18, 20. Each bearing comprises a plurality of ball bearings held between an inner race mounted on the shaft and an outer race supported on an inner surface of a cylindrical hub 22. Single bearings are shown by way of illustration, but two duplex bearing pairs may be used instead. The ball bearings may be formed of ceramic material, for example. They are lubricated by a grease.

Hub 22 is fastened to the wall of the housing 8 by bolts 24. The hub extends inwardly from the wall of the housing and around the shaft 6. A secondary chamber 26 containing the bearings 18, 20 is defined between the hub 22 and the shaft 6.

The end cap 7 is rigidly connected to the shaft 6 towards one end of the shaft, with the bearings engaging the shaft at locations between the end cap and the other end of the shaft.

This facilitates provision of the two bearings 18, 20 within a common chamber 26.

A turbo molecular drag pump 28, 30 is located between the first and second chambers 14, 26. A first part 32 of the drag pump includes one or more first spiral grooves defined by the outer surface of the hub 22. This groove faces the inner surface of a hollow cylindrical member 33 which is carried by the shaft 6, and the groove and the cylindrical member cooperate to form the first part 32 of the pump. A second part 34 of the drag pump includes one or more further spiral grooves having a smaller cross-section and pitch, defined on the inner surface of a ring 36 fastened to the inner circumferential surface of the hub at its distal end. This second groove faces the cylindrical outer surface of the shaft 6, and they cooperate to form the second part 34 of the pump.

An external vacuum pump 40 is connected to the second chamber 26. A sensor 42 is provided in the first chamber 14 to sense the pressure therein. The sensor is coupled to a controller 44 associated with the vacuum pump 40. The vacuum pump is operable to control the pressure in the first chamber by controlling the pressure in the second chamber. The controller 44 may for example be a "bang-bang" controller operable to switch the vacuum pump 40 on and off, in response to signals from the sensor in the first chamber to maintain the pressure in the first chamber within a predetermined range.

In operation of the flywheel assembly, the vacuum pump 40 is initially employed to substantially evacuate both the first and second chambers. Preferably, the first chamber is maintained at a pressure of approximately 0.01 mbar to enable the flywheel to operate at high speed without overheating due to gas drag. When the flywheel is running, the vacuum level in the first chamber will tend to drop (that is, the pressure increases), due to off-gassing of material (such as water vapour) from the flywheel. As the flywheel spins, the drag pump 30, 32 acts to pump gas molecules from the first chamber 14 into the second chamber 26. This will maintain a low pressure environment in the first chamber, and also increase the pressure in the second chamber. This facilitates use of a grease in the bearings 18, 20 having a vapour pressure higher than would otherwise be the case. For example, a pressure of greater than 0.1 mbar may be maintained in the second chamber.

Furthermore, as the bearings are provided in a second chamber separate from the first, any off-gassing from the bearings grease will not affect the pressure of the first chamber.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicant's invention.

What is claimed is:

1. A flywheel assembly comprising:
a housing;
a flywheel coupled to a shaft, and the shaft is rotatably mounted in the housing via first and second bearings, with the first bearing arranged to support one end of the shaft and the second bearing arranged to support the other end of the shaft;
a drive operable to rotate the flywheel and the shaft;
a primary chamber which is defined within the housing and contains the flywheel and a portion of the drive;
at least one secondary chamber which is defined within the housing, with the first and second bearings contained within the at least one secondary chamber; and
at least one molecular pump driven by the shaft for pumping gas molecules from the primary chamber to the at least one secondary chamber which contains both of the first and second bearings supporting the corresponding ends of the shaft,
wherein the first and second bearings are provided between the shaft and a hub which is fixedly mounted in the housing and extends inwardly along the shaft from a wall of the housing, and the at least one secondary chamber containing the first and second bearings is defined between the hub and the shaft.

2. The assembly of claim 1, wherein the flywheel is mounted on the shaft.

3. The assembly of claim 1, wherein an additional pump is provided to remove gases from the at least one secondary chamber.

4. The assembly of claim 3, wherein the additional pump is a getter pump.

5. The assembly of claim 3, wherein the additional pump is a vacuum pump.

6. The assembly of claim 5, including a controller for the vacuum pump, and a sensor for sensing a pressure in the primary chamber which is coupled to the controller, the controller being operable to control the vacuum pump with reference to signals from the sensor.

7. The assembly of claim 1, wherein the at least one molecular pump is provided adjacent to a distal end of the hub.

8. The assembly of claim 1, wherein the at least one molecular pump is a molecular drag pump.

9. The assembly of claim 1, wherein the at least one molecular pump is a molecular drag pump, and the molecular drag pump includes a first spiral groove formed on the hub.

10. The assembly of claim 9, wherein the molecular drag pump includes a second spiral groove, wherein the first and second spiral grooves are formed on an outer surface of the hub and within the hub, respectively.

11. The assembly of claim 1, wherein the flywheel carries a rotor of a motor and a stator of the motor is supported by the housing.

* * * * *